June 8, 1965 W. HERGERT 3,188,000
TAPE TRANSPORTING DEVICE
Filed Nov. 27, 1962 2 Sheets-Sheet 1

INVENTOR
Wilhelm Hergert by
Michael S. Striker
Attorney

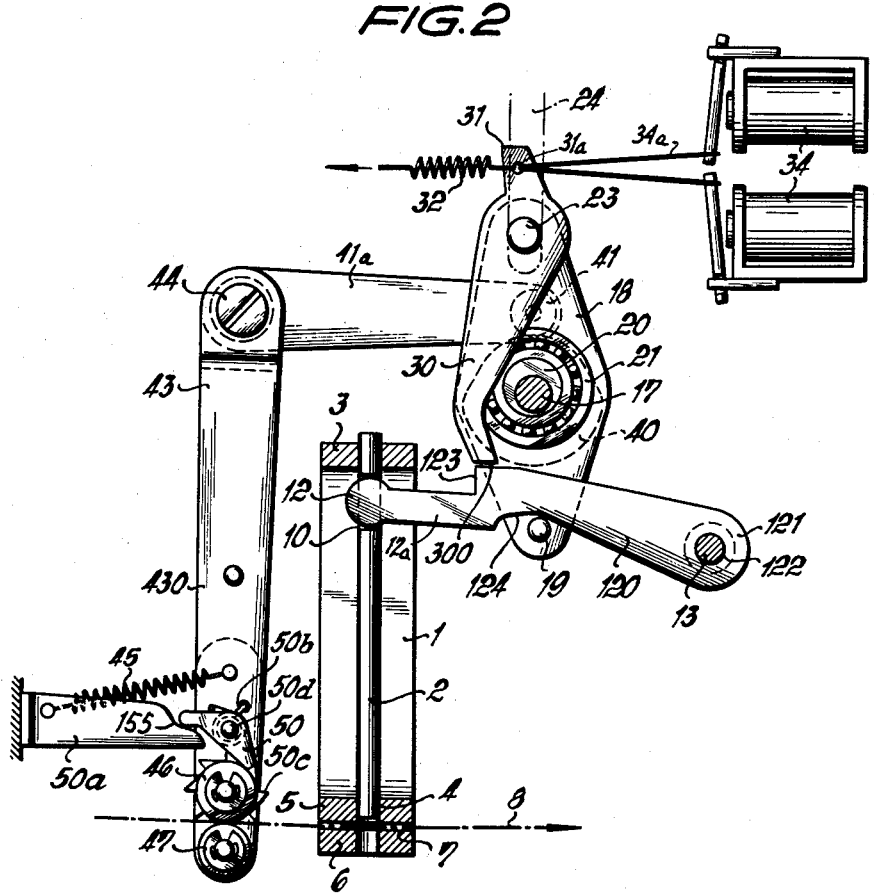

United States Patent Office 3,188,000
Patented June 8, 1965

3,188,000
TAPE TRANSPORTING DEVICE
Wilhelm Hergert, Wilhelmshaven, Germany, assignor to Olympia Werke A.G., Wilhelmshaven, Germany
Filed Nov. 27, 1962, Ser. No. 240,370
Claims priority, application Germany, Nov. 28, 1961, O 8,397
15 Claims. (Cl. 234—128)

The present invention relates to a tape transporting device, and more particularly to a transporting device for stepwise transporting a tape to a perforatiig station where perforations are punched into the tape.

Known transporting devices serving this purpose use sprockets engaging corresponding spaced transporting perforations provided in the blank tape. It is a disadvantage of this construction that rapid stepwise transport of the tape with the involved great accelerations and decelerations, causes higher stress on the edges of the transporting perforations than the material of the tape can tolerate, which results in damage to the transporting perforation. As a result, when the tape is later transported through a read-out station, the stepwise movement of the tape is inaccurate so that the sensing elements at the read-out station are not placed in the proper position over the coded perforations previously made by the perforator at the perforating station.

Other perforators use perforating punches which move in synchronism with the continuously transported tape. However, apparatus of this type has inherent disadvantages in that is is complicated, and requires rapid acceleration and deceleration of many elements and very accurate synchronization between the tape movement and the perforator movement.

It is also known to transport the tape by the perforating punches which requires a movement of the perforating punches in the transport direction of the tape. However, the necessary rocking movement of the perforator punches necessitates a complicated and expensive construction.

It is one object of the present invention to overcome the disadvantages of known transporting devices for transporting a tape, or other sheet material, and to provide a transporting device of simple and efficient construction which will not cause any damage to the tape, or sheet material.

Another object of the invention is to provide a transporting device for transporting a program tape stepwise at a perforator station so that the tape is transported in steps corresponding to the spacing between successive coded perforations made in the tape by the perforator punches.

Another object of the invention is to provide a transporting device for transporting an unperforated sheet material or tape in uniform steps.

Another object of the invention is to provide a transporting device capable of stepwise transporting a tape by frictional engagement between a reciprocating transporting means and the tape.

Another object of the invention is to effect frictional engagement between a transporting means and the tape during forward movement of the tape, and rolling engagement between the transporting means and the tape during the return movement of the transporting means while coded perforations are punched into the tape.

It is also an object of the present invention to provide an exactly synchronized operation of the tape transporting means and of the perforator punches.

With these objects in view, one embodiment of the invention comprises transporting means including a pair of cooperating rollers performing a reciprocating movement in a forward transporting direction, and in a return direction; and means for effecting a frictional coupling engagement between at least one of the rollers and a sheet material or tape located in the bight between the rollers only during the transporting movement of transporting means.

During the return movement of the transporting means, the rollers roll freely on the sheet material or tape so that the same is not transported by the rollers in the return direction.

Perforator punches, or other stop means, move in synchronism with the transporting means to hold the tape during the return movement of the transporting means. For example, the perforator punches will be in a position penetrating the tape while the transporting means performs its return movement with the transporting rollers rolling on the held tape.

In the preferred embodiment of the invention, an overrunning clutch permits rotation of one of the rollers only in one direction, which direction corresponds to a rolling of the respective roller on the tape during the return movement of the transporting means.

In order to prevent an uncontrolled movement of the tape while the stop means or the perforator punches are retracted, at least one of the rollers is again blocked against rotation at the end of the return movement and at the beginning of the transporting movement while the perforator punches are not yet in the perforating position.

A ratchet device, operatedly by a stationary actuating member in one end position of the transporting means, is preferably used for this purpose.

In the preferred embodiment of the invention, the perforator and the transporting member are operated in synchronism by being driven from the same shaft. The perforator punches cooperate with a stationary anvil, but it is also contemplated to combine the transporting device of the invention with perforator punches moving with the tape in the transporting direction, and perforating the tape during such movement.

The novel features which are considered as characteristic for the invention are set forth in particular in the appended claims. The invention itself, however, both as to its construction and its method of operation, will be best understood from the following description of specific embodiments when read in connection with the accompanying drawings, in which:

FIG. 2 is a cross sectional view of the transporting device of FIG. 1; and

FIG. 3 is a front view of a detail of the transporting device shown on an enlarged scale, and being partially shown in section.

Figure 1:
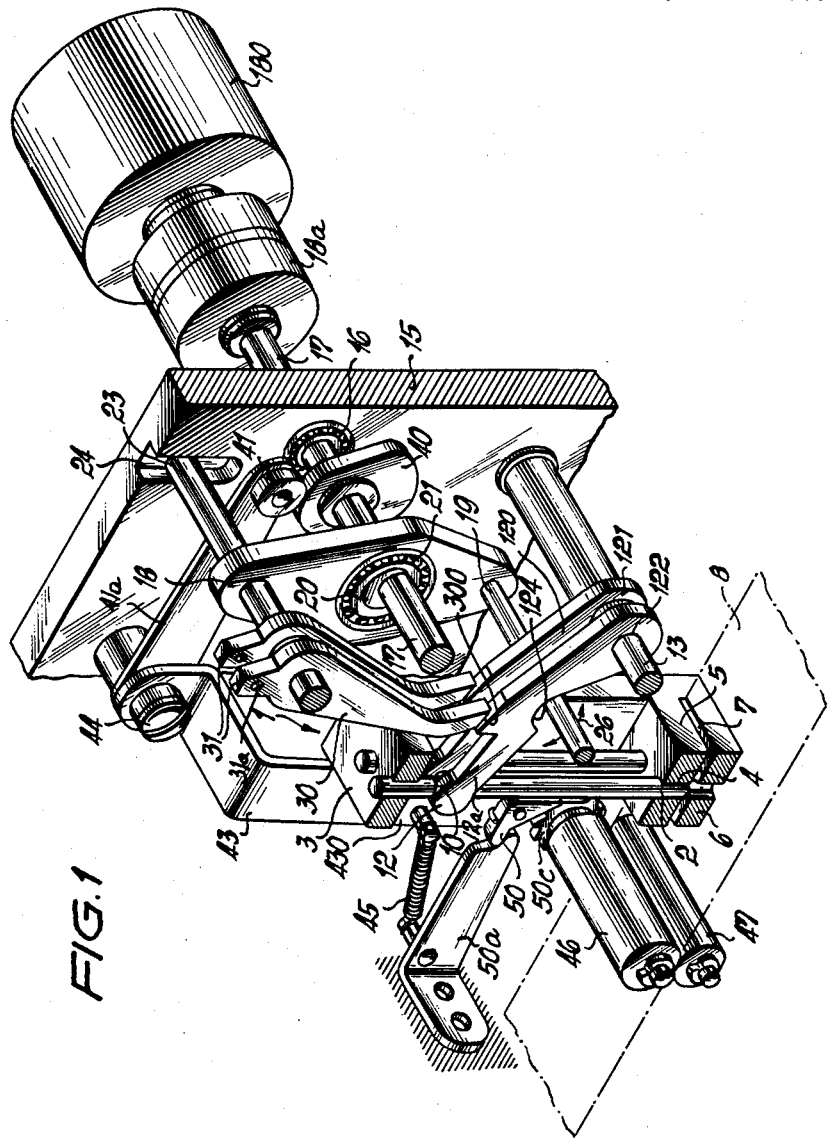
FIG. 1 is a perspective view of an embodiment of the invention in which the transporting device transports a tape to a perforator, one wall of the supporting casing being omitted for the sake of clarity.

Referring now to the drawings, a perforator frame 1 includes an upper part 3, and a lower part 5 provided with a slot 7 in which a tape 8 is guided. The forward portion of the lower part 5 is broken off in FIG. 1 for the sake of clarity. A set of perforating punches 2 is slidably guided in bores 4 of members 3 and 5, and have cutouts 10 respectively receiving the circular heads 12 of levers 120 having wider end portion 121 provided with bearing bores 122 through which a shaft 13 passes. Shaft 13 is supported in a pair of walls 15 of which only one is shown for the sake of clarity. Each lever 120 can perform an angular reciprocating movement about shaft 13 independently of the other levers 120, and during such angular reciprocating movement, the corresponding perforator punch 2 will be raised and lowered to pass through slot 7, and if the tape 8 is located in slot 7, the tape will be perforated.

Only two perforator punches 2 are illustrated in FIG. 1, but it will be understood that as many perforator punches 2 are arranged in a row across the tape as the particular code requires.

Each lever 120 has a high abutment portion 123 located opposite a corresponding abutment face 300 of a corresponding selector lever 30 in the illustrated position of selector levers 30. The selector levers 30 are turnable about a shaft 23, and when any selector lever 30 is turned in clockwise direction as viewed in FIGS. 1 and 2, its abutment face 300 will be located opposite a narrower end portion 12a of the respective lever 120 which is separated by steep shoulder from the abutment portion 23.

The underside of each lever 120 has a recess 124, and a rod 19 extends across recesses 124 of all levers 120. Rod 19 and shaft 23 are secured to a pair of connecting members 18 of which only one is shown in FIG. 1. The ends of shaft 23 are slidably guided in slots 24 in end walls 15. A drive motor 180 drives through a coupling 18a a drive shaft 17 mounted in ball bearings 16 in walls 15. Eccentric members 20, of which only one is shown in FIG. 1, are secured to shaft 17 and located in ball bearings 21 mounted in the connecting members 18. Consequently, rotation of drive shaft 7 by motor 180 will cause an oscillatory movement of connecting members 18. Since shaft 23 is mounted in a pair of vertical slots 24, it performs a rectilinear movement, and moves selector levers 30 up and down. The lower ends of connecting members 18 will perform a circular movement as indicated by the arrow 26 in FIG. 1.

During such movement, rod 19 engages the recesses 124 in levers 120, and raises the same together with the perforator punches 2. When the rod 19 moves downward again, selector levers 30 perform a corresponding downward movement, and those selector levers 30 which are in the position shown in FIG. 1, will engage with the respective abutment faces 300 the abutment portions 123 of the corresponding levers 120, and push the same down together with the perforator punches 2 which are thus actuated to move through slot 7 and to perforate a tape located in slot 7.

It will be understood that in accordance with the code, not all perforator punches are to be actuated by levers 120. The selector levers 30 are moved between the operative selecting position illustrated in the drawing, and an inoperative position in which the abutment faces are located opposite the recessed narrower portion 12a of the respective lever 120 by selector means shown in FIG. 2. The upper end of each selector lever 30 has an arm 31 provided with a bore 31a to which a spring means 32 is connected. A pair of wires 34a is also attached to each opening 31a, and connected to the armature of electromagnet means 34. Each electromagnetic means 34, when energized, turns the corresponding selector lever 30 in clockwise direction to its inoperative position, and when de-energized, permits the respective spring 32 to turn the selector lever 30 to its operative selecting position shown in FIGS. 1 and 2.

In the normal condition of the apparatus, the electromagnetic selector means 34 are energized, and consequently all selector levers are in the inoperative position in which the up and down movement of shaft 23 with selector levers 30 will be ineffective to push down levers 120 and perforator punches 2 since selector levers 30 moving downwardly in the inoperative position will not engage the narrow portions 12a of levers 120.

Levers 120 will be raised by the vertical component of the circular motion of rod 19, but move down only due to their own weight and the weight of the perforator punches 2 which is not sufficient for perforating the tape 8 so that the end faces of the perforator punches 2 will rest on the tape without perforating the same when the selector levers 30 do not engage the abutment portion 23 of levers 120.

A relay contact, not shown, is located in the circuit of each electro-magnetic selector means 34, and controlled by a relay winding which is energized by a control impulse. It will be understood by those skilled in the art that each control impulse associated with one of the electro-magnetic selector means 34 is also associated with a hole position represented by a perforator punch 2. One or several impulses arriving simultaneously at the relays of electro-magnetic selector means 34 will open the corresponding switches and de-energize a corresponding group of electro-magnetic means 34 so that springs 32 will move the respective selector levers 30 to the operative selecting position illustrated in FIG. 2.

Only the thus selected selector levers 30 will be coupled to the corresponding actuating lever 120, while selector levers 30 of electro-magnetic means 34 which remain energized, will remain in the inoperative position in which they are not coupled to the respective corresponding actuating lever 120 during the downward movement of all selector levers 30 under control of eccentric member 20 on drive shaft 17.

The perforator punches 2 whose actuating levers 120 are actuated by selector levers 30 in the coupled selecting position will be forcefully moved downward and perforate tape 8 in slot 7.

Evidently, the arrangement could be reversed, and spring 32 could act in the opposite direction to normally hold selector levers 30 in the inoperative position, while energizing of the electro-magnetic means 34 by signal impulse produces the force for turning selector levers 30 to the selecting position in which they are coupled to the actuating levers 120 during the downward movement of all selector levers 30.

The above described perforator apparatus is not an object of the present invention, but its description will facilitate the understanding of the transporting device according to the present invention which is used for stepwise transporting the tape 8 to the perforator punches 2 and through the guide slot 7.

Drive shaft 17 carries an eccentric cam 40 which rotates in synchronism with the eccentric member 20. A rockable transporting lever member 43 is turnably mounted on a stud shaft 44 secured to wall 15, and has a transporting urn 430 and a cam follower arm 41a carrying a cam follower roller 41 cooperating with cam 40 so that the transporting arm 430 of transporting lever member 43 is rocked. The free end of transporting arm 430 is connected by spring 45 to a stationary member 50a so that roller 41 is urged against the cam track of cam 40.

A slide 150 is attached by screws 153 and 154 to the lower end of lever arm 430, as best seen in FIG. 3. Slide 150 has slots 151 and 152 permitting a relative movement between lever arm 130 and slide 150. A shaft 47a is threaded into plate 150, and rotatably supports a roller 47. A spring 55 is secured to a projecting portion of shaft 47a, and to a pin, not shown, on arm 430, so that the slide 150 with roller 47 is urged upwardly as viewed in the drawing. Roller 47 thus cooperates with and abuts another roller 46 which is turnable on a shaft 46a. A flange on shaft 46a is clamped by screw 154 against an inner flange of a first toothed part of an overrunning clutch 51 whose second toother part is mounted on shaft 46 connected thereto for rotation, but slidable in axial direction so as to be urged by a spring 51a into a coupling position engaging the other toothed part of overrunning clutch 51. Due to the construction and shape of the teeth of overrunning clutch 51, roller 46 can turn only in one direction of rotation on shaft 46a, but is blocked against rotation in the opposite direction.

The axially movable part of overruning clutch 51 carries a ratchet wheel 50c which cooperates with a pawl 50 mounted on a pin 50d on transporting arm 430 and being loaded by spring 50b to move to a releasing position releasing the ratchet wheel 50c. However, when arm 430 is in the position illustrated in FIG. 2, a camming face 155 on the stationary member 50a engages ratchet pawl 50 and turns the same to the illustrated arresting position engaging and blocking ratchet wheel 50c and thereby roller 46, which is connected for rotation with ratchet wheel 50c through the axially shiftable clutch part which is non-rotatably connected with roller 46, but in turnable with the same about shaft 46a only in one direction in which such turning movement is not blocked by the overrunning clutch 51.

Cam 40 reciprocates transporting lever member 43 in synchronism with the up and down movement of selector levers 30, actuating levers 120, and perforator punches 2 which are reciprocated by eccentric member 20. The movements are timed in such a manner that the perforating means are in the retracted inoperative position shown in FIGS. 1 and 2 when the transporting lever member 43 performs a forward movement to the right as viewed in FIG. 2 out of the illustrated position. During return movement in the opposite direction, the perforator punches penetrate the tape 8 and thus prevent any movement of tape 8 from the right to the left as viewed in FIG. 2.

*Operation*

Assuming that a number of perforator punches 2 has been selected for operation by de-energization of electromagnetic means 34, the selected perforator punches will move between an inoperative retracted position and an operative perforating position. In the position illustrated in FIG. 2, the transporting arm 430 has just finished its return stroke to the left, and is about to begin its forward transporting stroke to the right. At the end of the return movement of transporting arm 430, pawl 50 has run onto the camming face 155 of the stationary member 50a, and has locked ratchet wheel 50c, and thereby roller 46 against rotation in counterclokwise direction as viewed in FIG. 2. Since spring 55 urges roller 47 against tape 8, uncontrolled slipping of tape 8 in the forward transporting direction to the right in FIG. 2 is prevented since tape 8 is clamped between rollers 46 and 47, and friction prevents forward movement of tape 8. During the following rotation of drive shaft 17, cam 40 will turn transporting lever member 43, so that transporting arm 430 moves to the right whereby pawl 50 slides off the cam means face 155 of the stationary member 50a, and is urged by its spring 50b to a releasing position releasing ratched wheel 50c.

Rollers 46 and 47 would tend to roll on tape 8, but such rolling movement of roller 46 is blocked by the overrunning clutch 51 which act in clockwise direction of rotation as a blocking means for roller 46. Since spring 55 urges roller 47 against roller 46, the rollers clamp tape 8 between each other, and since the rollers cannot roll on tape 8, the clamped tape is frictionally coupled to the pair of rollers 46 and 47 and transported to the right during the corresponding forward transporting movement of transporting arm 430.

Cam 40 is so designed that tape 8 is transported a distance corresponding to the distance between successive rows of coded perforations produced by perforator punches 2 in tape 8.

At the end of the forward transporting stroke, tape 8 is properly positioned for the next perforating operation, and transporting arm 430 starts its return movement from the right to the left as viewed in FIG. 2. At the same time, the perforator punches move to the perforating position penetrating tape 8, and holding the same so that tape 8 cannot be taken along by the rollers 46 and 47 moving in their return direction. Since overrunning clutch 51 does not block turning movement of roller 46 in counterclockwise direction, rollers 46 and 47 roll freely on the tape 8 so that no pull is exerted on the tape while the same is held by the perforator punches. Near the end of the return stroke, when the perforator punches are retracted and release tape 8, pawl 50 runs onto the camming face 155 and is turned to its arresting position engaging ratchet wheel 50c so that roller 46 is blocked against counter clockwise movement, and tape 8 is clamped until the forward transporting movement is again started. In this manner, uncontrolled slipping of the tape 8 in forward transportating direction is prevented, which could not be blocked by the overrunning clutch 51 since clutch 51 permits turning movement of roller 46 in counterclockwise direction corresponding to a forward movement of tape 8 relative to roller 46.

The angular spacing of the teeth of ratchet 50c and of overrunning clutch 51 correspond to the distances between successive rows of coded perforations in tape 8.

It will be understood that each of the elements described above, or two or more together, may also find a useful application in other types of transporting devices for stepwise transporting a sheet material differing from the types described above.

While the invention has been illustrated and described as embodied in a transporting device for transporting a tape to the perforator punches of a coding perforator, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A transporting device for transporting a tape to a perforator comprising, in combination, guide means for guiding a tape along a path; perforator means movable between a perforating position located in said path and holding the tape, and an inoperative position releasing the tape; a transporting lever mounted for angular reciprocation and having a transporting arm moving during reciprocation along said path in a forward direction and in a return direction; a drive shaft having eccentric means for reciprocating said perforator means and said transporting lever in synchronism so that said perforator means is in said inoperative position when said transporting arm moves in said forward direction and is in said perforating position when said transporting arm moves in said return direction; a pair of cooperating rollers mounted on said transporting arm for rotation about parallel axes transverse to said path and forming a bight located in said path for receiving said tape; and blocking means for blocking rotation of at least one of said rollers in one direction of rotation so that rotation of said one roller due to frictional engagement between said one roller and the tape is blocked during forward movement of said transporting arm whereby the tape is frictionally coupled with said one roller and is transported in said forward direction while said perforator means is in said inoperative position, and whereby frictional engagement between the tape and said rollers effects rolling of said rollers on the tape during movement of said transporting arm in said return direction while the tape is held by said perforator means in said perforating position.

2. A transporting device for transporting a tape to a perforator comprising, in combination, guide means for guiding a tape along a path; perforator means movable between a perforating position located in said path and holding the tape, and an inoperative position releasing the tape; a transporting member mounted for reciprocation along said path in a forward direction and in a return direction; drive means for moving said perforator means and said transporting member in synchronism so that said perforator means is in said inoperative position when said transporting member moves in said forward direction and is in said perforating position when said transporting member moves in said return direction; a pair of cooperating rollers mounted on said transporting member for rotation about parallel axes transverse to said path and forming a bight located in said path for receiving said tape; and blocking means for blocking rotation of at least one of said rollers in one direction of rotation so that rotation of said one roller due to frictional engagement between said one roller and the tape is blocked during forward movement of said transporting member whereby the tape is frictionally coupled with said one roller and is transported in said forward direction while said perforator means is in said inoperative position, and whereby frictional engagement between the tape and said rollers effects rolling of said rollers on the tape during movement of said transporting member in said return direction while the tape is held by said perforator means in said perforating position.

3. A transporting device for transporting a tape to a perforator comprising, in combination, guide means for guiding a tape along a path; perforator means movable between a perforating position located in said path and holding the tape, and an inoperative position releasing the tape; a transporting member mounted for reciprocation along said path in a forward direction and in a return direction; drive means for moving said perforator means and said transporting member in synchronism so that said perforator means is in said inoperative position when said transporting member moves in said forward direction and is in said perforating position when said transporting member moves in said return direction; a pair of cooperating rollers mounted on said transporting member for rotation about parallel axes transvesre to said path and forming a bight located in said path for receiving said tape; and overrunning clutch means for blocking rotation of at least one of said rollers in one direction of rotation so that rotation of said one roller due to frictional engagement between said one roller and the tape is blocked by said overrunning clutch means during forward movement of said transporting member whereby the tape is frictionally coupled with said one roller and is transported in said forward direction while said perforator means is in said inoperative position, and whereby frictional engagement between the tape and said rollers effects rolling of said rollers on the tape during movement of said transporting member in said return direction while the tape is held by said perforator means in said perforating position in the released condition of said overrunning clutch means.

4. A transporting device for transporting a tape comprising, in combination, guide means for guiding a tape along a path; stop means movable between a holding position located in said path and holding the tape, and an inoperative position releasing the tape; a transporting member mounted for reciprocation along said path in a forward direction and in a return direction; drive means for moving said stop means and said transporting member in synchronism so that stop means is in said inoperative position when said transporting member moves in said forward direction and is in said holding position when said transporting member moves in said return direction; a pair of cooperating rollers mounted on said transporting member for rotation about parallel axes transverse to said path and forming a bight located in said path for receiving said tape; blocking means for blocking rotation of at least one of said rollers in one direction of rotation so that rotation of said one roller due to frictional engagement between said one roller and the tape is blocked during forward movement of said transporting member whereby the tape is frictionally coupled with said one roller and is transported in said forward direction while said stop means is in said inoperative position, and whereby frictional engagement between the tape and said rollers effects rolling of said rollers on the tape during movement of said transporting member in said return direction while the tape is held by said stop means in said holding position; and arresting means for blocking rotation of said one roller in the opposite direction of rotation at the end of said return movement and at the beginning of said forward movement so that frictional engagement between said rollers and said tape prevents uncontrolled forward movement of the tape before said stop means arrives in said holding position.

5. A transporting device for transporting a tape to a perforator comprising, in combination, guide means for guiding a tape along a path; perforator means movable between a perforating position located in said path and holding the tape, and an inoperative position releasing the tape; a transporting member mounted for reciprocation along said path in a forward direction and in a return direction; drive means for moving said perforator means and said transporting member in synchronism so that said perforator means is in said inoperative position when said transporting member moves in said forward direction and is in said perforating position when said transporting member moves in said return direction; a pair of cooperating rollers mounted on said transporting member for rotation about parallel axes transverse to said path and forming a bight located in said path for receiving said tape; blocking means for blocking rotation of at least one of said rollers in one direction of rotation so that rotation of said one roller due to frictional engagement between said one roller and the tape is blocked during forward movement of said transporting member whereby the tape is frictionally coupled with said one roller and is transported in said forward direction while said perforator means is in said inoperative position, and whereby frictional engagement between the tape and said rollers effects rolling of said rollers on the tape during movement of said transporting member in said return direction while the tape is held by said perforator means in said perforating position; and spring means operatively connecting said other roller with said transporting member for urging said other roller toward said one roller and toward the tape.

6. A transporting device for transporting a tape to a perforator comprising, in combination, guide means for guiding a tape along a path; perforator means movable between a perforating position located in said path and holding the tape, and an inoperative position releasing the tape; a transporting member mounted for reciprocation along said path in a forward direction and in a return direction; drive means for moving said perforator means and said transporting member in synchronism so that said perforator means is in said inoperative position when said transporting member moves in said forward direction and is in said holding position when said transporting member moves in said return direction; a pair of cooperating rollers mounted on said transporting member for rotation about parallel axes transverse to said path and forming a bight located in said path for receiving said tape; overrunning clutch means for blocking rotation of at least one of said rollers in one direction of rotation so that rotation of said one roller due to frictional engagement between said one roller and the tape is blocked by said overrunning clutch means during forward movement of said transporting member whereby the tape is frictionally coupled with said one roller and is transported in said forward direction while said perforator means is in said inoperative position, and whereby frictional engagement between the tape and said rollers effects rolling of said rollers on the tape during movement of said transporting member in said return direction while the tape is held by said perforator means in said perforating position in the released condition of said overrunning clutch means; spring means operatively connecting said other roller with said transporting member for urging said other roller toward said one roller and toward the tape; and arresting means for blocking rotation of said one roller in the opposite direction of rotation at the end of said return movement and at the beginning of said forward movement so that frictional engagement between said rollers and said tape prevents uncontrolled forward movement of the tape before said perforator means arrives in said perforating position.

7. A transporting device for transporting a tape to a perforator comprising, in combination, guide means for guiding a tape along a path; perforator means movable between a perforating position located in said path and holding the tape, and an inoperative position releasing the tape; a transporting member mounted for deciprocation along said path in a forward direction and in a return direction; drive means for moving said perforator means and said transporting member in synchronism so that said perforator means is in said inoperative position when said transporting member moves in said forward direction and is in said perforating position when said transporting member moves in said return direction; a pair of cooperating rollers mounted on said transporting member for rotation about parallel axes transverse to said path and forming a bight located in said path for receiving said tape; overrunning clutch means for blocking rotation of at least one of said rollers in one direction of rotation so that rotation of said one roller due to frictional engagement between said one roller and the tape is blocked by said overrunning clutch means during forward movement of said transporting member whereby the tape is frictionally coupled with said one roller and is transported in said forward direction while said perforator means is in said inoperative position, and whereby frictional engagement between the tape and said rollers effects rolling of said rollers on the tape during movement of said transporting member in said return direction while the tape is held by said perforator means in said perforating position in the released condition of said overrunning clutch means; and arresting means for including a stationary cam, and means for blocking rotation of said one roller in the opposite direction engaged and actuated by said cam at the end of said return movement and at the beginning of said forward movement so that frictional engagement between said rollers and said tape prevents uncontrolled forward movement of the tape before said perforator means arrives in said perforating position; spring means operatively connecting said other roller with said transporting member for urging said other roller toward said one roller and toward the tape.

8. A transporting device for transporting a tape comprising, in combination, guide means for guiding a tape along a path; stop means movable between a holding position located in said path and holding the tape, and an inoperative position releasing the tape; a transporting member mounted for reciprocation along said path in a forward direction and in a return direction; drive means for moving said stop means and said transporting member in synchronism so that said stop means is in said inoperative position when said transporting member moves in said forward direction and is in said holding position when said transporting member moves in said return direction; a pair of cooperating rollers mounted on said transporting member for rotation about parallel axes transverse to said path and forming a bight located in said path for receiving said tape; blocking means for blocking rotation of at least one of said rollers in one direction of rotation so that rotation of said one roller due to frictional engagement between said one roller and the tape is blocked during forward movement of said transporting member whereby the tape is frictionally coupled with said one roller and is transported in said forward direction while said stop means is in said inoperative position, and whereby frictional engagement between the tape and said rollers effects rolling of said rollers on the tape during movement of said transporting member in said return direction while the tape is held by said stop means in said holding position; and arresting means including a stationary actuating member and arresting means mounted on said transporting member and controlled by said actuating member to arrest said one roller for blocking rotation of said one roller in the opposite direction of rotation at the end of said return movement and at the beginning of said forward movement so that frictional engagement between said rollers prevents uncontrolled forward movement of the tape before said stop means arrives in said holding position.

9. A transporting device as set forth in claim 8 wherein said overrunning clutch means includes two cooperating toothed clutch members spring-loaded to engage each other, one of said clutch members being secured to said one roller for rotation therewith, and the other clutch member being fixedly secured to said transporting member.

10. A transporting device for transporting a tape comprising, in combination, guide means for guiding a tape along a path; stop means movable between a holding position located in said path and holding the tape, and an inoperative position releasing the tape; a transporting member mounted for reciprocation along said path in a forward direction and in a return direction; drive means for moving said stop means and said transporting member in synchronism so that said stop means is in said inoperative position when said transporting member moves in said forward direction and is in said holding position when said transporting member moves in said return direction; a pair of cooperating rollers mounted on said transporting member for rotation about parallel axes transverse to said path and forminng a bight located in said path for receiving said tape; blocking means for blocking rotation of at least one of said rollers in one direction of rotation so that rotation of said one roller due to frictional engagement between said one roller and the tape is blocked during forward movement of said transporting member whereby the tape is frictionally coupled with said one roller and is transported in said forward direction while said stop means is in said inoperative position, and whereby frictional engagement between the tape and said rollers effects rolling of said rollers on the tape during movement of said transporting member in said return direction while the tape is held by said stop means in said holding position; and arresting means including a ratchet wheel secured to said one roller for rotation therewith, a ratchet pawl mounted on said transporting member, spring means urging said pawl to a position releasing said ratchet wheel, and a stationary actuating member having a camming face for engaging said pawl and for moving the same to a position arresting said ratchet wheel so as to arrest said one roller at the end of said return movement and at the beginning of said forward movement so that frictional engagement between said rollers and said tape prevents uncontrolled forward movement of the tape before said stop means arrives in said holding position.

11. A transporting device for transporting a tape comprising, in combination, guide means for guiding a tape along a path; stop means movable between a holding position located in said path and holding the tape, and an inoperative position releasing the tape; a transporting member mounted for reciprocation along said path in a forward direction and in a return direction; drive means for moving said stop means and said transporting member in synchronism so that said stop means is in said inoperative position when said transporting member moves in said forward direction and is in said holding position when said transporting member moves in said return direction; a pair of cooperating rollers mounted on said transporting member for rotation about parallel axes transverse to said path and forming a bight located in said path for receiving said tape; overrunning clutch means for blocking rotation of at least one of said rollers in one direction of rotation so that rotation of said one roller due to frictional engagement between said one roller and the tape is blocked by said overrunning clutch means during forward movement of said transporting member whereby the tape is frictionally coupled with said one roller and is transported in said forward direction while said stop means is in said inoperative position, and whereby frictional engagement between the tape and said rollers effects rolling of said rollers on the tape during movement of said transporting member in said return direction while the tape is held by said stop means in said holding position in the released condition of said overrunning clutch means; spring means operatively connecting said other roller with said transporting member for urging said other roller toward said one roller and toward the tape; and arresting means including a ratchet wheel secured to said one roller for rotation therewith, a ratchet pawl mounted on said transporting member, spring means urging said pawl to a position releasing said ratchet wheel, and a stationary actuating member having a camming face for engaging said pawl and for moving the same to a position arresting said ratchet wheel so as to arrest said one roller at the end of said return movement and at the beginning of said forward movement so that frictional engagement between said rollers and said tape prevents uncontrolled forward movement of the tape before said stop means arrives in said holding position.

12. A transporting device as set forth in claim 11 wherein said transporting member is a rockable lever having said rollers at one end thereof.

13. A transporting device as set forth in claim 11 wherein said drive means include a cam shaft connected to said perforator means for operating the same and having a cam, said transporting member having a cam follower portion cooperating with said cam.

14. A transporting device as set forth in claim 13 wherein said transporting member is a bell crank lever one arm of which is said cam follower portion; and including spring means for urging said transporting lever to move in said return direction and for urging said cam follower portion into engagement with said cam.

15. A transporting device for transporting a tape to a perforator comprising, in combination, guide means for guiding a tape along a path; perforator means movable between a perforating position located in said path and holding the tape, and an inoperative position releasing the tape; a transporting member mounted for reciprocation along said path in a forward direction and in a return direction; drive means for moving said perforator means and said transporting member in synchronism so that said perforator means is in said inoperative position when said transporting member moves in said forward direction and is in said perforating position when said transporting member moves in said return direction; a pair of cooperating rollers mounted on said transporting member for rotation about parallel axes transverse to said path and forming a bight located in said path for receiving said tape; overrunning clutch means for blocking rotation of at least one of said rollers in one direction of rotation so that rotation of said one roller due to frictional engagement between said one roller and the tape is blocked by said overrunning clutch means during forward movement of said transporting member whereby the tape is frictionally coupled with said one roller and is transported in said while said perforator means is in said inoperative position, and whereby frictional engagement between the tape and said rollers effects rolling of said rollers on the tape during movement of said transporting member in said return direction while the tape is held by said stop means in said holding position in the released condition of said overrunning clutch means; spring means operatively connecting said other roller with said transporting member for urging said other roller toward said one roller and toward the tape; and arresting means including a ratchet wheel secured to said one roller for rotation therewith, a ratchet pawl mounted on said transporting member, spring means urging said pawl to a position releasing said ratchet wheel, and a stationary actuating member having a camming face for engaging said pawl and for moving the same to a position arresting said ratchet wheel so as to arrest said one roller at the end of said return movement and at the beginning of said forward movement so that frictional engagement between said rollers prevents uncontrolled forward movement of the tape before said perforator means arrives in said perforating position.

References Cited by the Examiner
UNITED STATES PATENTS

| | | | |
|---|---|---|---|
| 980,316 | 1/11 | Meahl | 234—128 X |
| 1,976,352 | 10/34 | Maul | 234—152 X |
| 2,348,456 | 5/44 | Dickerman | 226—152 X |

J. SPENCER OVERHOLSER, *Primary Examiner.*